United States Patent [19]

Pond

[11] 4,292,003
[45] Sep. 29, 1981

[54] CONNECTORS FOR FURNITURE
[75] Inventor: Alan R. Pond, London, England
[73] Assignee: Underman Greeman Berger Limited, London, England
[21] Appl. No.: 33,522
[22] Filed: Apr. 26, 1979
[30] Foreign Application Priority Data
  Apr. 28, 1978 [GB] United Kingdom ............... 17062/78
[51] Int. Cl.³ .............................................. B25G 3/00
[52] U.S. Cl. .................... 403/407; 403/348; 403/231
[58] Field of Search .............. 403/348, 349, 407, 231, 403/343; 24/221 K

[56] References Cited
U.S. PATENT DOCUMENTS
  2,811,765  11/1957  Mathews, Jr. et al. .......... 24/221 K
  3,862,809  1/1975   Bodner .............................. 403/407
  3,963,361  6/1976   Schenk ........................... 403/349 X FOREIGN PATENT DOCUMENTS
  1410993  10/1975  United Kingdom ............... 403/348
  1489868  10/1977  United Kingdom ............... 403/407

Primary Examiner—Andrew V. Kundrat
Attorney, Agent, or Firm—Emory L. Groff, Jr.

[57] ABSTRACT

A connector, or so called knock down fitting, for securing together two parts of an article of furniture, such as panels P1, P2 at right angles. The connector comprises two members in which one member A has a bore 5 and the other member B has a stud 8 enterable into the bore when the two members are brought together, the bore and stud having co-operating wings 10 and shoulders 7 with angled abutment surfaces 6 whereby relative rotation between the wings and bore causes the members to be drawn and secured tightly together.

2 Claims, 5 Drawing Figures

CONNECTORS FOR FURNITURE

BACKGROUND OF THE INVENTION

This invention relates to a connector for furniture and is primarily concerned with the joining together of two furniture parts, such as panels, in abutment and at right angles.

A known connector type has two elongate body members which can be brought together and secured with each body member having two projecting bosses for engagement with and retention in bores formed in respective furniture panels. The members are retained in the respective panels by frictional engagement of the bosses with the bores, and the two members are secured together by a screw.

An object of this invention is to provide a connector generally of the above construction which avoids a screw means to secure the two members.

SUMMARY OF THE INVENTION

According to this invention there is provided a connector for furniture parts, the connector comprising two members in which one member has a bore and the other member has a stud enterable into the bore when the two members are brought together, the bore and stud having co-operating wings and shoulders with angled abutment surfaces whereby relative rotation between the wings and bore causes the members to be drawn and secured tightly together.

One member is preferably partly locatable within the other member. The stud preferably will be rotatably mounted in one member and may have a T-shape end forming the wings. The bore may include a transverse slot through which the T-shape end may pass, whereafter rotation of the stud causes the T-shape end to engage the shoulders formed by the ends of the slot.

BRIEF DESCRIPTION OF DRAWINGS

Further preferred features may be seen from an embodiment shown in the accompanying drawings by way of an example. In the drawings.

DESCRIPTION OF PREFERRED EMBODIMENTS

Figure 1:
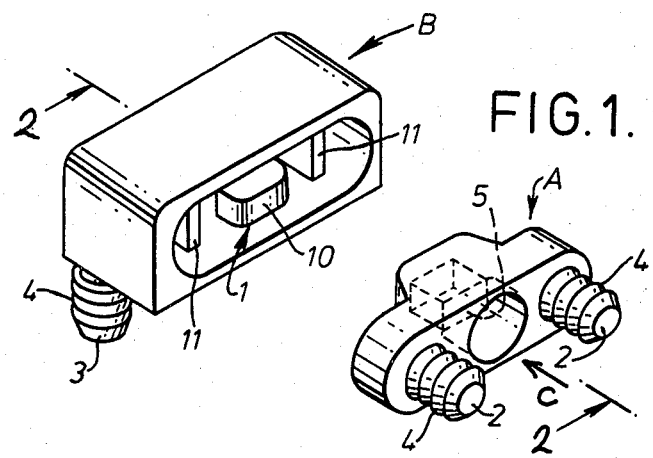
FIG. 1 shows a connector in perspective with the two body members separated.
Figure 2:
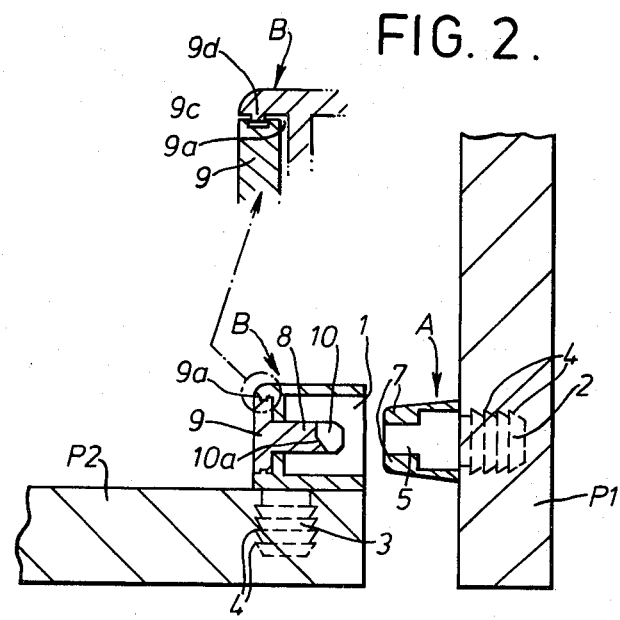
FIG. 2 shows the connector with the two members separated and in section along 2—2 of FIG. 1.
Figure 3:
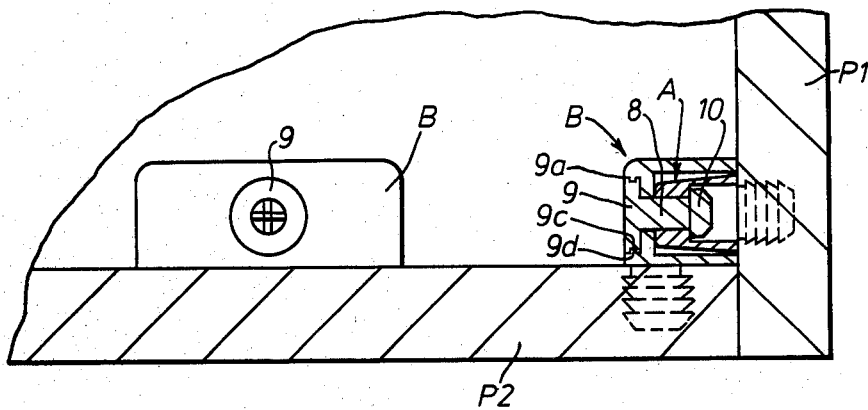
FIG. 3 shows the connector as in FIG. 2 with the two members engaged.
Figure 4:
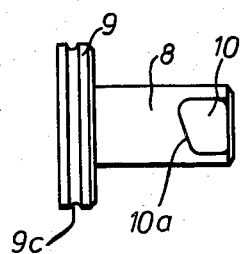
FIG. 4 shows a detail of the stud in side view.

Referring to FIGS. 1 to 3 of the drawings, the connector is formed from two elongate body members A and B with member A partly locatable within a recess 1 in member B. Each member includes two similar projecting bosses 2 and 3 provided with circumferential ridges 4. These bosses are for frictional engagement with bores formed in respective furniture parts P1 and P2 to be joined.

Figure 5:
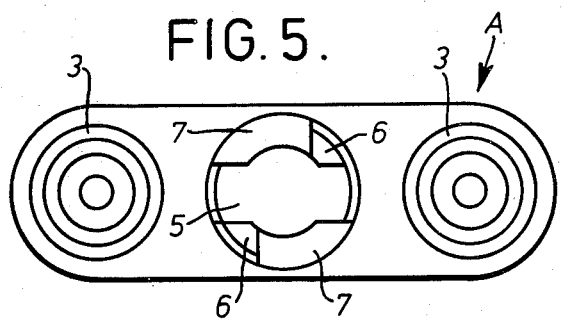
FIG. 5 shows a view looking in the direction C of FIG. 1.

The member A has a bore 5 which is formed as an elongate slot with parts 6 of the internal shoulders 7 which define the slot angled to form abutment surfaces (see FIG. 5).

A stud 8 has a head 9 which locates in recess 9a of the other member B, and a T-shape end 10 forming wings which when suitable aligned may pass through the slotted bore 5 of the member A. Angled surfaces 10a of the wings are complementary to the angled parts 6 on the shoulders 7 of the bore 5 and rotation of the stud 8 in the appropriate direction engages the wings with the shoulders and produces a force to firmly draw the members A and B together and secure same tightly.

The embodiment provides a connector formed from three parts of which members A and B may be manufactured from a rigid plastics material with stud 8 of metal or of plastics and provides a simple means affording repeated connection and uncoupling if desired. Ribs 11 may be provided inside member B and against which member A may bear.

The head 9 of the stud 8 includes a peripheral recess 9c which engages with a small internal projecting annulus 9d within the recess 9a. When the stud head 9 is brought into engagement with the recess 9a it may be pressed home so that the recess engages the annulus preventing detachment and ensuring the stud is held captive but rotatable.

I claim:

1. A connector for connecting two elements together in non-parallel relation, the connector comprising two elongated body members, means at one face of each body member to engage a respective one of said elements, a generally coaxially elongated cavity in another face of one of said body members non-parallel with said firstmentioned face thereof and dimensioned non-rotatably to receive the other body member whereby said one face of the latter is exposed from the cavity, a stud having a head engageable with the bottom of the cavity to limit displacement of the stud into the cavity while permitting rotation of the stud about its axis, the stud having a T-shaped end portion within the cavity, the surfaces of the limbs of the T presented toward the head being cam surfaces oppositely angularly inclined with respect to a plane to which the axis of the stud is perpendicular, and a bore in said other body member perpendicular to said one face thereof, two shoulders integral with said other body member flanking the end portion of the bore remote from said one face of the other body member to give said end portion the form of an elongated slot, the ends of the shoulders inward of the bore comprising respective abutment surfaces generally in a common plane to which the axis of the bore is perpendicular and cam surfaces oppositely inclined with respect to said common plane to extend from circumferentially opposite ends of the respective abutment surfaces away from said one surface of said other body member, the slot being dimensioned for passage therethrough of the limbs of the stud when the latter is suitably angularly oriented and the length of the stud between its head and limbs being such in relation to the dimensions of the shoulders that rotation of the stud will cause a camming action between the limbs of the stud and the cam surfaces of the shoulders which will draw said other body member into the cavity until the limbs of the stud ride onto said abutment surfaces releasably to hold said body members together.

2. A connector as claimed in claim 1, wherein the head of the stud is circular and cooperates with a circular aperture in a wall of said one body member constituting the bottom of the cavity; and lip and groove means adjacent thereto which prevents axial displacement of said stud head but permits rotation of the stud relative to said one body member and wherein the head of the stud is formed in its face exposed from said aperture with means engageable by a tool to rotate the stud.

* * * * *